US011789923B2

(12) United States Patent
Shergill et al.

(10) Patent No.: US 11,789,923 B2
(45) Date of Patent: Oct. 17, 2023

(54) COMPRESSION UNITS IN AN INDEX BLOCK

(71) Applicant: Oracle International Corporation, Redwood Shores, CA (US)

(72) Inventors: Kam Shergill, Maidenhead (GB); Ankita Kumar, Bellevue, WA (US); Himanshu Chatterjee, Fremont, CA (US); Vineet Marwah, San Ramon, CA (US); Srinivas Vemuri, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 632 days.

(21) Appl. No.: 15/267,759

(22) Filed: Sep. 16, 2016

(65) Prior Publication Data

US 2017/0116280 A1 Apr. 27, 2017

Related U.S. Application Data

(60) Provisional application No. 62/245,979, filed on Oct. 23, 2015.

(51) Int. Cl.
*G06F 16/23* (2019.01)
*G06F 16/22* (2019.01)

(52) U.S. Cl.
CPC ...... *G06F 16/2343* (2019.01); *G06F 16/2272* (2019.01)

(58) Field of Classification Search
CPC ......... G06F 17/30362; G06F 17/30336; G06F 16/2343; G06F 16/2272

USPC ....................................................... 707/693
See application file for complete search history.

(56) References Cited

U.S. PATENT DOCUMENTS

| 6,016,493 | A * | 1/2000 | Burrows ........... G06F 17/30631 |
| 6,754,617 | B1 | 6/2004 | Ejerhed |
| 7,031,994 | B2 | 4/2006 | Lao et al. |
| 7,496,589 | B1 | 2/2009 | Jain et al. |
| 8,356,060 | B2 | 1/2013 | Marwah et al. |
| 8,645,337 | B2 | 2/2014 | Kapoor et al. |

(Continued)

OTHER PUBLICATIONS

Ailamaki, Anastassia, et al, "Weaving Relations for Cache Performance," Proceedings of the 27th International Conference on Very Large Data Bases, Rome, Italy, Sep. 11-14, 2001, 14 pages.

(Continued)

*Primary Examiner* — Hicham Skhoun
(74) *Attorney, Agent, or Firm* — Hickman Becker Bingham Ledesma LLP (57) ABSTRACT

A method and apparatus for compression units in an index block is provided. A particular leaf block of a database index for a table is generated. The particular leaf block corresponds to a particular range of key values. A compression scheme is determined for a plurality of index entries with key values within the particular range. A compression unit that includes a plurality of compressed index entries is generated by applying the compression scheme to the plurality of index entries. Compression metadata describing the compression scheme is generated. The compression unit and the compression metadata is stored in the particular leaf block. In response to a request, at least a portion of the compression unit is decompressed to access one or more index entries.

20 Claims, 5 Drawing Sheets

(56) References Cited

U.S. PATENT DOCUMENTS

| | | |
|---|---|---|
| 8,832,142 B2 | 9/2014 | Marwah et al. |
| 8,935,223 B2 | 1/2015 | Ganesh |
| 9,495,466 B2 | 11/2016 | Geringer et al. |
| 9,559,720 B2 | 1/2017 | Marwah et al. |
| 2005/0065776 A1 | 3/2005 | Coden |
| 2009/0292679 A1* | 11/2009 | Ganesh ............ G06F 17/30 |
| 2010/0082545 A1 | 4/2010 | Bhattacharjee |
| 2010/0114843 A1 | 5/2010 | Farrar |
| 2010/0161569 A1 | 6/2010 | Schreter |
| 2010/0318497 A1 | 12/2010 | Price |
| 2012/0296881 A1 | 11/2012 | Christian |
| 2012/0323929 A1 | 12/2012 | Kimura |
| 2013/0103655 A1 | 4/2013 | Fanghaenel |
| 2014/0074805 A1* | 3/2014 | Kapoor ............ G06F 16/24561 |
| | | 707/693 |
| 2014/0297651 A1 | 10/2014 | Shadmon |
| 2015/0032763 A1 | 1/2015 | Marwah et al. |
| 2015/0186448 A1* | 7/2015 | Delafranier ............ G06F 16/219 |
| | | 707/703 |
| 2015/0193487 A1* | 7/2015 | Demidov ............ G06F 16/2272 |
| | | 707/756 |
| 2015/0317327 A1* | 11/2015 | He .................. G06F 16/1744 |
| | | 707/693 |
| 2016/0171053 A1 | 6/2016 | Shergill |
| 2019/0087600 A1* | 3/2019 | Sion .................. H04L 63/10 |

OTHER PUBLICATIONS

Elmasri, et al., "Fundatmentals of Database Systems," Third Edition, Addison-Wesley Longman, Inc., Copyright ©2000, ISBN-0-8053-1755-4, pp. 32, 70, 118, 131-132, 134, 155-159, 170, 252-254, 558, 569-573, 591-592, and 789-790 (26 pgs).

Index compression—IBM DB2 9.7 for Linux, UNIX, and Windows, "Index compression", internet https://www-01.ibm.com/support/knowledgecenter/api/content/nl/enus/SSEPGG_9.7.0, viewed on Jan. 20, 2016, 2 pgs.

Chavan, U.S. Appl. No. 16/022,377, filed Jun. 28, 2018, Office Action, dated Mar. 23, 2020.

* cited by examiner

COMPRESSION UNITS IN AN INDEX BLOCK

CROSS-REFERENCE TO RELATED APPLICATIONS

This application claims benefit of Provisional Appln. 62/245,979, filed Oct. 23, 2015, the entire contents of which is hereby incorporated by reference as if fully set forth herein, under 35 U.S.C. § 119(e).

FIELD

Embodiments described herein relate generally to index compression, and more specifically, to techniques for compression units in an index block.

BACKGROUND

Relational databases store information in tables that are organized into rows and columns. In non-relational terminology, a row is a record and a column is a field. A client or other user retrieves information from the tables by entering a request that is converted to a query and submitted to a database server. The database server accesses the table(s) specified by the query to retrieve the information that satisfies the query. The query may include one or more predicates which must be satisfied by matching rows.

In order to determine rows of the table that satisfy the predicate, a full table scan may be performed to compare each row in each table block with the predicate. This approach does not scale well with data volume. For example, if the number of rows in a table and/or the amount of data in columns not specified by the one or more predicates is very large, then the full table scan methodology becomes very inefficient because of the unnecessary amount of disk input/output (I/O) involved. More specifically, a large number of database blocks storing the rows of the table are retrieved from secondary storage in order to perform the table scan.

Accordingly, many database systems provide indexes to increase the speed of the data retrieval process. Indexes are primarily used to speed up access to data in a corresponding table. An index is a body of index entries ordered by key values in key fields. In a relational database, an index key may be a set of one or more columns of a table, referred to herein as "key column/s." Each index entry includes a key value based on the corresponding data record (e.g. the values in the key columns of a row in a relational database table). In addition to the key value, each index entry includes a record identifier that references the corresponding data record (e.g. a row identifier in a relational database). Rows with specific key values can be quickly identified using the index because the index entries of the index are ordered by key value. The database index can be used to reduce the number of database blocks retrieved from secondary storage, such as by identifying the relevant database blocks that match the one or more predicates in a query when the one or more predicates refer to the key fields.

It is not uncommon for a table to have multiple indexes, and/or for an index to refer to multiple key columns of a table. As a result of these two factors, a set of indexes for a single table may require a large amount of storage. This amount of storage can sometimes exceed the amount of storage space required by the table itself. In fact, total index storage for some database systems exceeds 100 GB in size. Large amounts of index data result in larger storage costs, increased power consumption, and performance problems due to increased I/O. Due to the size required to store indexes, it becomes imperative to efficiently compress indexes. At the same time, the compression should be lightweight enough to allow fast decompression, so we do not lose the benefit of using an index for fast access.

Although many techniques exist for table compression, limited compression techniques are applied to indexes. One reason that limited compression techniques are applied to indexes is that there is also an overhead cost to accessing compressed data. The amount of overhead depends on the compression scheme applied. As noted above, database indexes are selected with the expectation that they will be accessed frequently. Thus, frequently accessed index data that is compressed will frequently incur decompression overhead due to frequent access of the compressed index data.

Some lightweight index compression techniques are described by U.S. patent application Ser. No. 14/572,765, filed Dec. 16, 2014, entitled "ADAPTIVE INDEX LEAF BLOCK COMPRESSION," which is hereby incorporated by reference as if fully set forth herein. These techniques include prefix key and advanced low compression, which result in modest compression without a loss in performance.

Thus, there is a need for compression techniques in an index block.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the embodiments. It will be apparent, however, that the embodiments may be practiced without these specific details. In other instances, well-known structures and devices are shown in block diagram form in order to avoid unnecessarily obscuring embodiments.

General Overview

Techniques are described herein for compression units in an index block. A compression unit is a data structure that includes a plurality of compressed index entries that belong in a particular leaf block of a database index, such as a leaf block of a B-tree index of a table. The compression unit is generated from a plurality of index entries that have a key value that falls in a range corresponding to the particular block. A compression scheme is determined for the compression unit, which may be different from the compression scheme/s applied to other compression units of the index. The plurality of compressed index entries in the compression unit are compressed in accordance with the individual compression scheme determined for the compression unit. Use of compression units in a database index reduces storage footprint and provides a performance improvement due to decreased I/O.

The compression unit may be self-describing. That is, all of the metadata required to decompress the compression unit may be stored within the compression unit itself. In some embodiments, the implementation of compression units in one or more leaf blocks of a database index is transparent to processes that use the database index. That is, the processes will be provided access to index entries without knowledge that some entries may have been retrieved from a compression unit.

In some embodiments, the compression unit is stored in a leaf block of a database index as a single index row. A leaf block that stores a compression unit may also include one or more individual index entries outside of any compression unit. In some embodiments, the individual index entries are also stored as individual index rows in the leaf block.

In some embodiments, after a compression unit is generated, the compressed index entries of the compression unit are not modified until a compression unit update operation. Even though the compression unit is not modified between compression unit update operations, the database index may still be updated when the corresponding indexed table is modified. For example, the deletion of index entries from the database index may be tracked by storing invalidity metadata indicating whether a compressed index entry in a compression unit is still a valid index entry in the database index. In some embodiments, new index entries are added to the database index by adding individual index entries in the respective leaf blocks. In some embodiments, when an index entry is modified in the database due to a key value change for the corresponding row, the original compressed index entry is marked invalid, and a new individual index entry is added to the database index. New individual index entries of a leaf block may be incorporated into an updated compression unit during a compression unit update operation, such as when a compression unit update operation is performed on a compression unit stored in the same leaf block as the new individual index entries.

Database Indexes

A database index on a set of one or more key columns of a table allows for fast retrieval of a small set of randomly distributed rows from the table without performing a table scan. A database server creates and maintains the database index. Generally, the database index is maintained such that the database index automatically reflects changes to data, such as row insertions, row deletions, and/or row updates. For example, the database index may be automatically updated in response to DML, operations that modify data in the indexed table.

A server, such as a database server, is a combination of integrated software components and an allocation of computational resources, such as memory, a computing device, and processes on the computing device for executing the integrated software components. The combination of the software and computational resources are dedicated to providing a particular type of function on behalf of clients of the server. A database server is a server that governs and facilitates access to one or more databases, such as by processing requests by clients to access the one or more databases. Database servers are described in greater detail hereinafter.

B-Tree Index

One example of a database index is a B-tree index. A B-tree index is a hierarchical arrangement of two types of nodes: leaf nodes and branch nodes. Leaf nodes reside at the lowest level of the B-tree hierarchy. A leaf node contains one or more index entries. An index entry corresponds to a row of the table, and includes a key value based on the row's column values from the key column/s upon which the index is built. An index entry also includes a row identifier that references the corresponding row. In some embodiments, one or more index entries of a leaf node are compression units that each represent a plurality of compressed index entries. Compression units shall be described in greater detail hereinafter.

Figure 1:
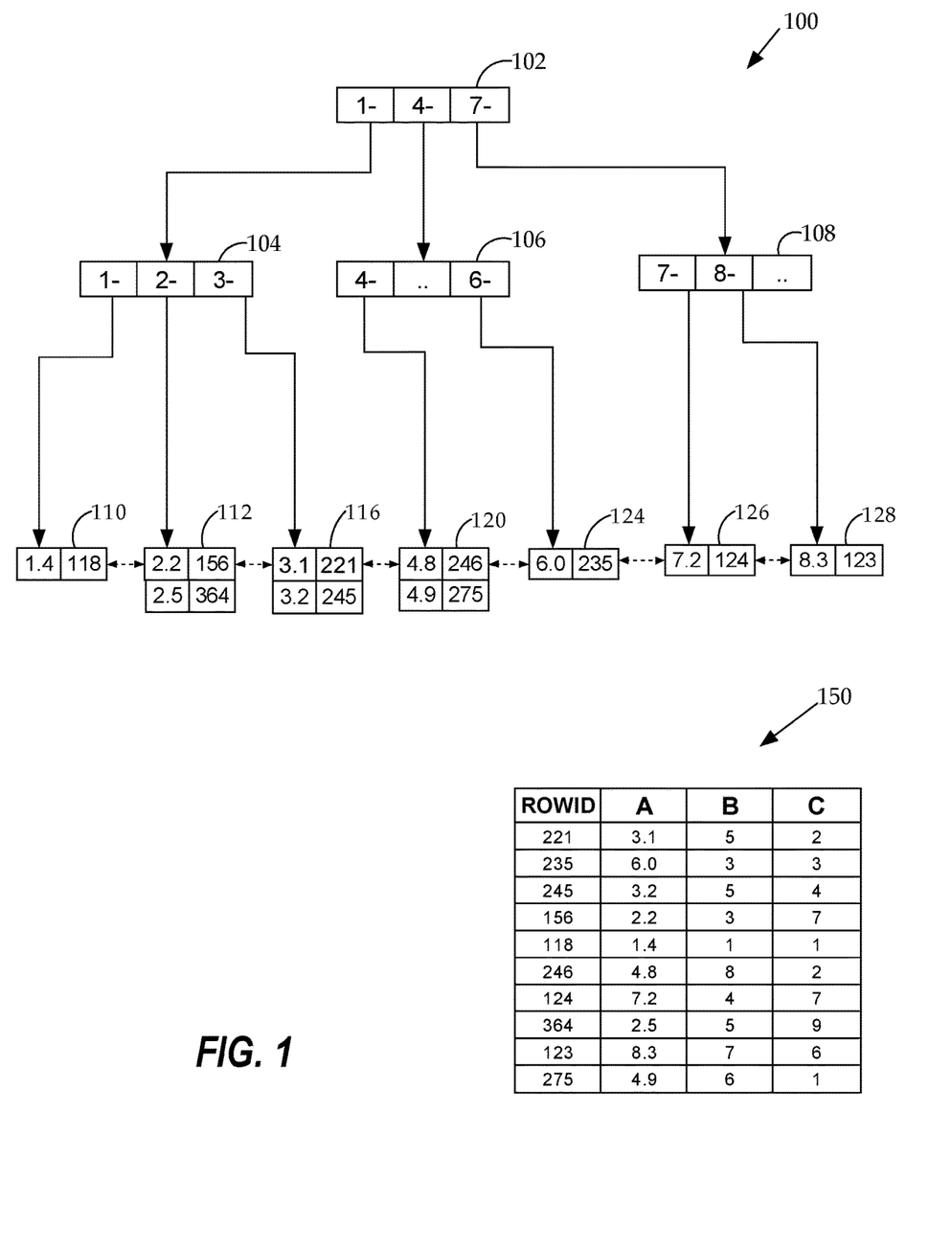
FIG. 1 is a block diagram depicting an example B-tree index in accordance with one or more embodiments.

FIG. 1 is a block diagram depicting an example B-tree index in accordance with one or more embodiments. B-tree index 100 is built using column A of table 100 as a key column. B-tree index 100 has leaf nodes 110-128 collectively holding the values of column A. Specifically, leaf node 110 holds the index value 1.4 from column A for a row with rowid=118. As another example, leaf node 128 contains an index value of 8.3 from column A for a row with rowid=123. In the depicted example, each leaf node contains a pointer or other link to a previous and subsequent leaf node, if such a leaf node exists. For example, leaf node 126, which contains an index value of 7.2, points to leaf node 128, which contains an index value of 8.3, and to leaf node 124, which contains an index value of 6.0. This allows a direct traversal of the ordered key values stored in the leaf nodes 110-128 without traversing the branch nodes 102-108 of the B-tree index 100.

The non-leaf nodes of a B-tree index are branch nodes. Branch nodes contain information that indicates a range of values. In the illustrated B-tree index 100, nodes 102-108 are branch nodes that each correspond to a different range of key values for the key columns. All nodes that descend from a particular branch node correspond to the values that fall within the range of values for the particular branch node. For example, node 106 is a branch node that corresponds to the numerical range [4, 7) (i.e. from 4, inclusive, up to but not including 7, exclusive. Consequently, leaf nodes 120-124, all of which descend from branch node 106 7 in the B-tree index 100, correspond to values that fall within the numerical range [4, 7). In a B-tree index, a parent branch node includes information that indicates the particular range/s corresponding to each of its child nodes.

A B-tree index is balanced. That is, all leaf blocks are automatically maintained at the same depth. For example, B-tree index 100 has three levels, with the root node 102 at depth=0, other branch nodes 104-108 at depth=1, and leaf nodes 110-128 at depth=2. Each level of the B-tree index 100 includes nodes that span the entire range of key values. Thus, an upper bound is known for the retrieval of any record from any leaf block in the B-tree index 100, and retrieval operations generally take about the same amount of time.

Index Blocks

In a hierarchical database index, such as a B-tree index, index data may be stored in index blocks, such as branch blocks and leaf blocks. As used herein, the term "index block" refers to a unit of persistent storage used to store index data. In some embodiments, an index block is a unit of persistent storage in secondary storage, such as on a magnetic disk. The size of an index block may be the smallest unit of persistent storage that a database server reads or writes, and/or a multiple thereof. Index blocks may include branch blocks that store index structure data, and leaf blocks that store index entries. At a minimum, branch blocks store the minimum key value prefix needed to make a branching decision, such as when searching the index for a particular key value.

Leaf Blocks

As used herein, the term "leaf block" refers to a unit of persistent storage used to store index entries corresponding to the rows of an indexed table. A leaf block is an index block that contains a set of index entries with key values that fall in a particular range. In a B-tree index, the particular range corresponding to a particular leaf block is indicated by its parent node, which may be stored in a branch block.

Each index entry includes a set of one or more key values and a corresponding row identifier that references the corresponding row. A single leaf node of a B-tree may correspond to a single leaf block. Alternatively and/or in addition, a single leaf node of a B-tree may correspond to multiple leaf blocks that are stored consecutively in persistent storage. Although embodiments are not so limited, one or more embodiments described herein have a one-to-one correspondence between leaf nodes and leaf blocks.

Compression Unit

As used herein, the term "compression unit" refers to a data structure that includes a plurality of compressed index entries that belong in a particular leaf block. The plurality of compressed index entries is compressed according to a compression scheme corresponding to the compression unit. As used herein, the term "compression scheme" refers to one or more compression techniques and/or parameters thereof. The compression scheme of a particular compression unit may be customized to the particular compression unit such that the compression scheme of different compression units may differ.

Unless otherwise specified, embodiments are not limited to any particular compression technique, even though they may be described with reference to a specified compression technique. The compression techniques may take advantage of an expected format and/or nature of the index entries, and may compress the entries in a manner that has low decompression overhead. For example, the compression techniques may allow a portion of a compression unit to be decompressed and accessed without decompressing the entire compression unit. Example compression techniques that may be used in for compression units are described in greater detail hereinafter.

Figure 2A:
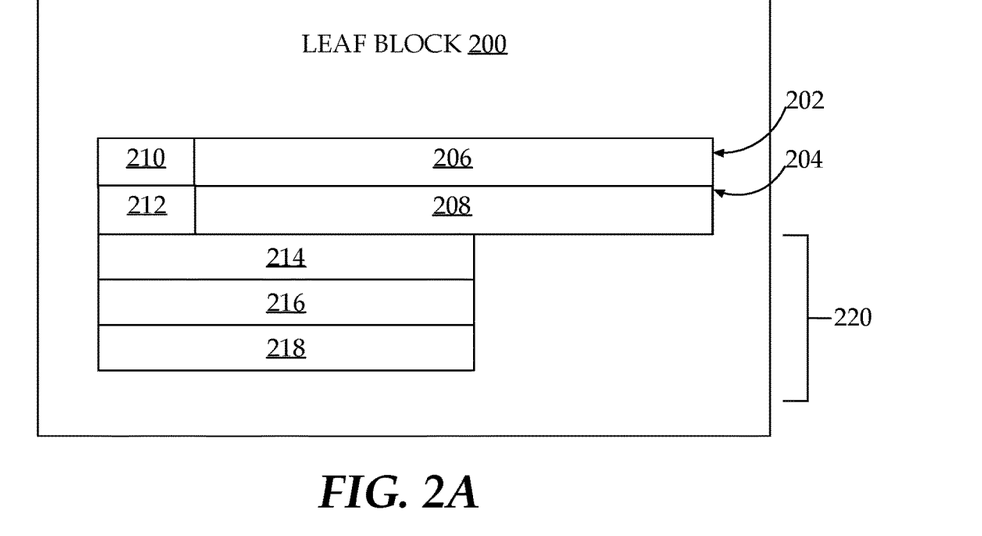
FIG. 2A is a block diagram depicting an example leaf block of a database index in accordance with one or more embodiments.

FIG. 2A is a block diagram depicting an example leaf block of a database index in accordance with one or more embodiments. Leaf block 200 includes compression units 202-204. Each compression unit 202-204 may potentially represent a large number, such as thousands, of index entries 206-208. In some embodiments, a leaf block may have up to one compression unit. Alternatively and/or in addition, one or more leaf blocks may have multiple compression units.

In some embodiments, different leaf blocks of a database index may include a different number of compression units, including zero compression units. A leaf block may include block metadata, such as block header information, that indicates whether the leaf block includes a compression unit.

Each compression unit 202-204 has corresponding compression unit metadata 210-212 that completely describes the compression scheme of the compression unit 202-204. For example, compression unit 202 includes a plurality of compressed index entries 206 that are compressed in accordance with a compression scheme described by compression unit metadata 210, and compression unit 204 includes a plurality of compressed index entries 208 that are compressed in accordance with a compression scheme described by compression unit metadata 212.

Compression Unit Metadata

The compression unit metadata 210-212 for a respective compression unit 202-204 may identify one or more compression techniques and/or parameters thereof that are applied to the plurality of compressed index entries 206-208 of the respective compression unit 202-204. For example, when a particular compression scheme includes dictionary compression, the compression unit metadata 210-212 may include a data dictionary that includes values stored within the particular compression unit that are specific to the compression scheme applied to the particular compression unit.

A compression unit 202-204 and its compression unit metadata 210-212 are stored in the leaf block 200 to which the plurality of compressed index entries 206-208 of the compression unit 202-204 belong. In some embodiments, a compression unit is self-describing. A self-describing compression unit includes, in the compression unit, the compression unit metadata of the compression unit. That is, the compression unit metadata 210-212 that completely describes the compression scheme of the compression unit 202-204 is part of the compression unit 202-204. Thus, no outside information stored outside of the leaf block 200 needs to be accessed to decompress a self-describing compression unit. A compression unit 202-204 may be self-describing (such as by including data that completely describes its compression scheme), even if additional compression unit metadata is stored outside of the compression unit 202-204.

In some embodiments, the inclusion of compression units 202-204 in one or more leaf blocks 200 of a database index is transparent to processes that use the database index. That is, a process that uses the database index does not have knowledge or need knowledge of the compression unit 202-204 when it uses the database index. The process will access index entries without knowledge that some index entries may have been retrieved from a compression unit 202-204. In some embodiments, compression units 202-204 have additional components, which shall be described in greater detail hereinafter with respect to FIG. 2B.

Compression Unit as an Index Row

In some embodiments, a compression unit 202-204 is structured as a single row of data for storage in a database index block. For example, compression units 202-204 may be stored as two rows within the leaf block 200 to which the corresponding pluralities of compressed index entries 206-208 belong.

For example, a database management system may be designed to access table data as individual blocks, where a block is the smallest unit of data that the database management system reads from secondary storage. In this case, the database index may be stored as an index table comprising a plurality of index rows that are stored in a plurality of leaf index blocks. A compression unit 202-204 may be stored as a single index row of the index table that actually represents a plurality of compressed index entries 206-208.

Individual Index Entries

A leaf block 200 that stores one or more compressed index entries 206-208 may also store zero, one or multiple individual index entries 214-218. Leaf block 200 includes individual index entries 214-218 that belong in the leaf block 200. That is, the individual index entries 214-218 have key values that are in the range corresponding to the leaf block 200. The individual index entries 214-218 of the leaf block 200 are not represented in the plurality of compressed index entries 206-208 of any compression units 202-204 of the leaf block 200. In some embodiments, the individual index entries are stored in a non-compressed region 220 of the leaf block 200.

The individual index entries 214-218 may be each stored as individual rows in the database index block 200. In some embodiments, when an index block 200 includes one or more compression units 202-204, individual index rows 214-218 are added to the index block 200 when one or more index entries are added to the database index. For example, when one or more compression units 202-204 exist in the leaf block 200, an individual index row 214-218 may be added to the leaf block 200 because a new row was added to the underlying table with a key value in the range corresponding to the leaf block 200. In some embodiments, after a compression unit 202-204 is written to a leaf block 200, the remaining free space 220 in the leaf block 200 is filled with new individual index entries 214-218.

In some embodiments, when there is no longer available space in the leaf block 200 to store a new index entry, a compression unit update operation is triggered, which generates an updated compression unit that includes the valid index entries of the current compression unit and the new individual index entries 214-218 of the leaf block 200. Alternatively and/or in addition, a leaf block split operation may be triggered on the leaf block 200. Compression unit update operations and leaf block split operations shall be described in greater detail hereinafter.

The individual index entries 214-218 are not associated with any compression unit metadata 210-212. Thus, no compression unit compression scheme is applied to the individual index entries 214-218. However, other compression schemes, such as block-level index compression schemes external to the compression unit, may be applied to the individual index entries 214-218. Examples of such block-level index compression schemes are described in U.S. patent application Ser. No. 14/572,765, filed Dec. 16, 2014, entitled "ADAPTIVE INDEX LEAF BLOCK COMPRESSION," which is hereby incorporated by reference as if fully set forth herein.

In some embodiments, the individual index entries 214-218 are ordered relative to each other by key value, but are not ordered relative to any plurality of compressed index entries 206-208 contained in any compression unit 202-204 of the leaf block 200. Within a particular compression unit 202, the respective plurality of compressed index entries 206 may be ordered relative to the other compressed index entries 206 in the same compression unit 202, but are not ordered relative to any plurality of compressed index entries 208 in other compression units 204 or any individual index entries 214-218 in the leaf block 200.

Generating a Compression Unit

Figure 2B:
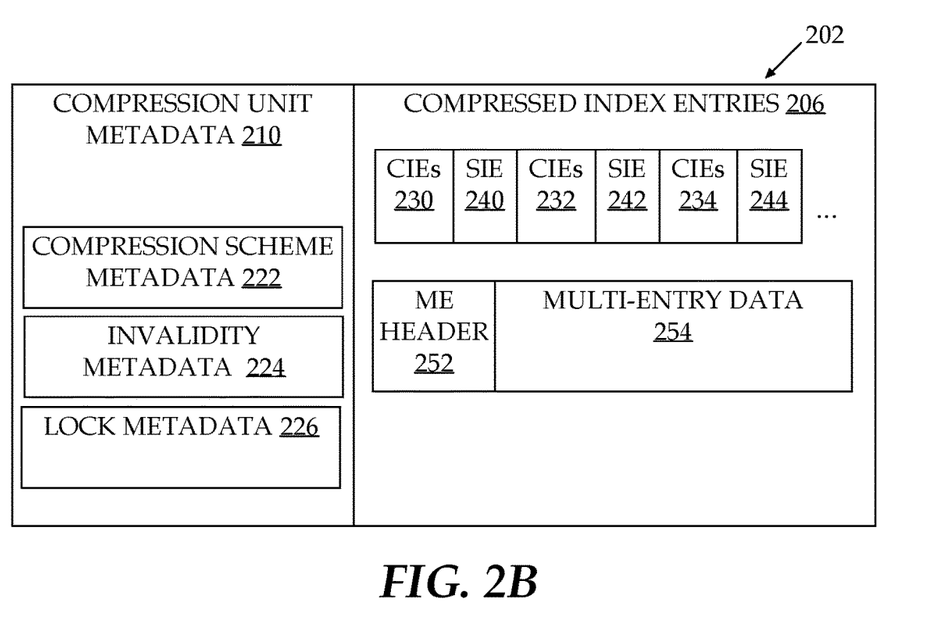
FIG. 2B is a block diagram depicting an example compression unit in accordance with one or more embodiments.

FIG. 2B is a block diagram depicting an example compression unit in accordance with one or more embodiments. Although only compression unit 202 is shown in this detailed view, one or more elements shown with respect to compression unit 202 may be present in any number of compression units 202-204.

A compression unit 202 is generated by compressing a plurality of index entries in accordance with a compression scheme. In some embodiments, the plurality of index entries is analyzed to determine the compression scheme, including one or more compression techniques to apply to the plurality of index entries and/or one or more parameters of the one or more compression techniques. The compression unit metadata 210 is also generated. In some embodiments, the compression unit metadata 210 is a header of the compression unit 202. The compression unit metadata 210 includes compression scheme metadata 222 that describes the compression techniques that were applied to the plurality of compressed index entries 206.

In some embodiments, a plurality of compressed index entries 202 that belong to a particular leaf block 200 of a database index are buffered until it is determined that a compression unit 202 should be generated. The determination to generate the compression unit 202 may be based on a number of buffered index entries in the plurality of compressed index entries, a maximum size for a leaf block, the compressibility of the data, and/or other factors.

In some embodiments, the plurality of compressed index entries 206 in an existing compression unit 202 and a plurality of individual index entries 214-218 that are not part of any compression unit are used to generate an updated compression unit that replaces both the existing compression unit 202 and the individual index entries 214-218. The set of index entries may be analyzed to determine an updated compression scheme for the updated compression unit, which may be the same and/or different than the compression scheme of the original compression unit 202. This process is referred to herein as recompression and/or a compression unit update operation, and is described in greater detail hereinafter.

Figure 3:
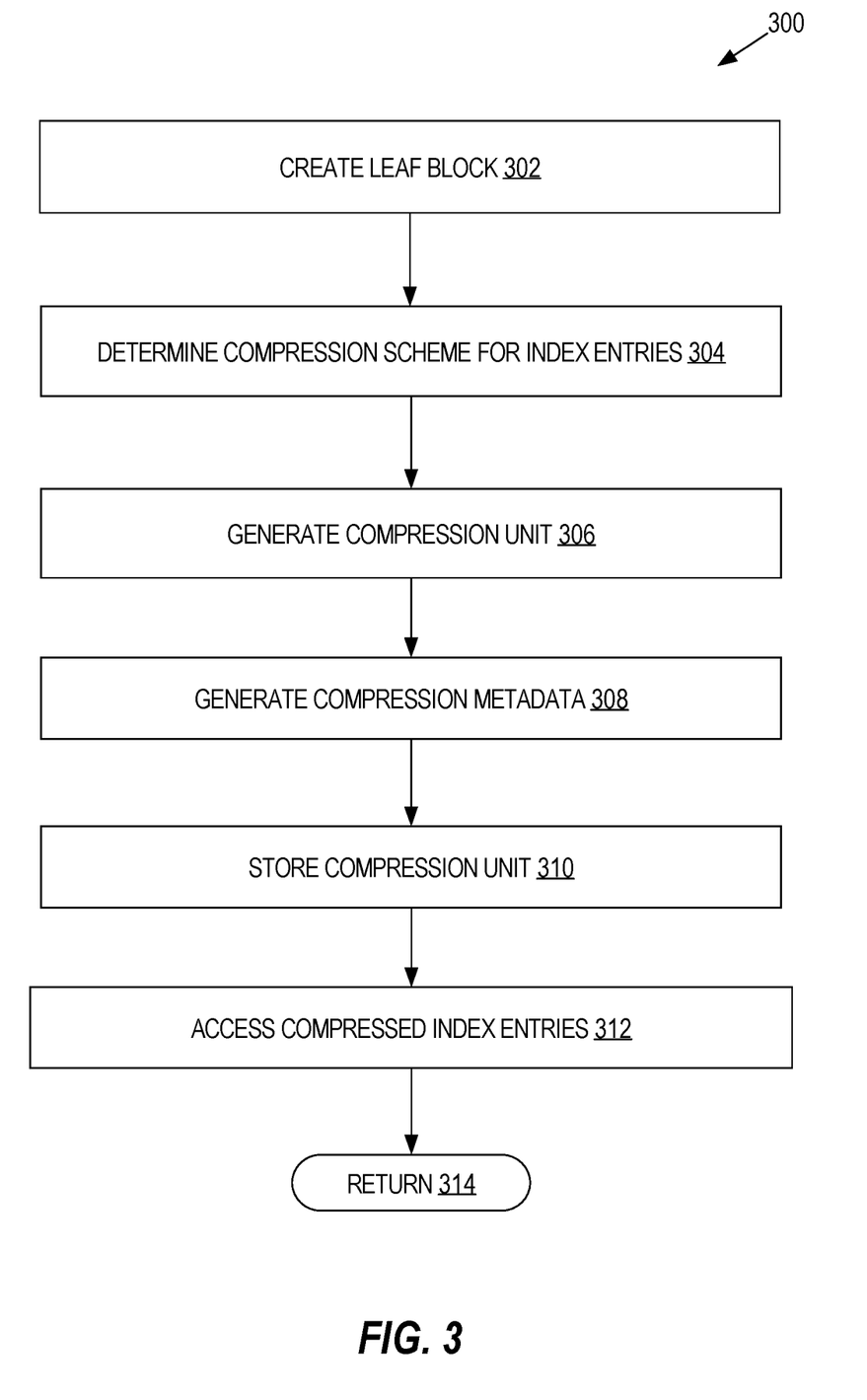
FIG. 3 is a flow diagram that illustrates an example process for creating a leaf block that includes a compression unit in accordance with one or more embodiments.
Figure 5:
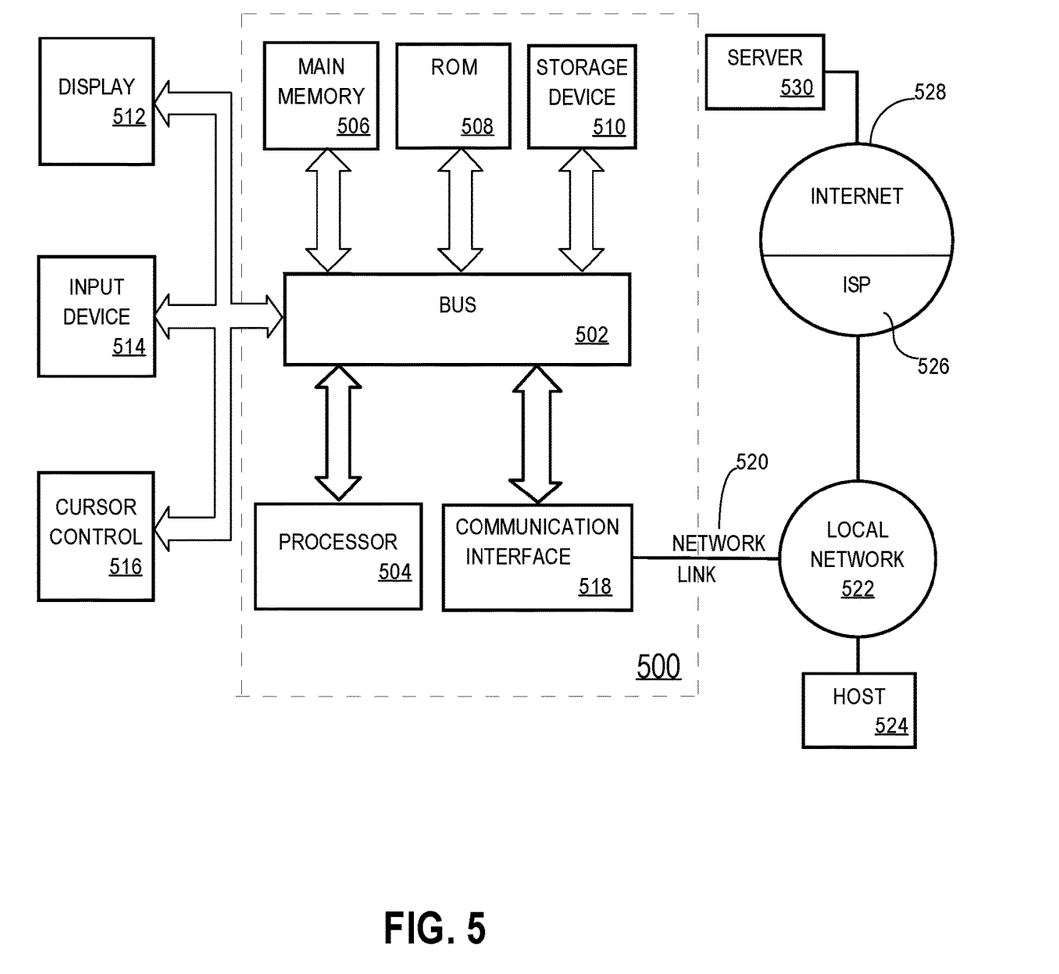
FIG. 5 illustrates a computer system upon which one or more embodiments may be implemented.

FIG. 3 is a flow diagram that illustrates an example process for creating a leaf block that includes a compression unit in accordance with one or more embodiments. Process 300 may be performed by one or more computing devices and/or processes thereof. For example, one or more blocks of process 300 may be performed by computing device 500. In some embodiments, one or more blocks of process 300 are performed by a database server.

At block 302, a particular leaf block 200 of a database index is created for an index table. The particular leaf block 200 corresponds to a particular range of key values for a set of one or more key columns of the indexed table.

At block 304, a compression scheme is determined for a plurality of index entries with key values within the particular range of key values corresponding to the particular leaf block 200. The compression scheme is determined by analyzing the plurality of index entries. The compression scheme is customized to the compression unit to be created.

At block 306, a compression unit 202 is generated by applying the compression scheme to the plurality of index entries. The compression unit 202 includes a plurality of compressed index entries 206 within the particular range of key values. The plurality of compressed index entries 206 are ordered relative to other compressed index entries 206 in the same compression unit 202 based on key value.

At block 308, compression metadata 210 is generated that describes the compression scheme of the compression unit 202. In some embodiments, the compression unit 202 includes the compression metadata 210 and is self-describing. That is, the compression unit 202 includes the necessary information to decompress the plurality of compressed index entries 206.

At block 310, the compression unit 202 and the compression unit metadata 210 is stored in the particular leaf block 200. In some embodiments, the compression unit metadata 210 includes the compression scheme metadata 222 that describes the compression scheme applied to the plurality of compressed index entries 206. In some embodiments, the compression unit metadata 210 is part of the compression unit 202. For example, the compression metadata 210 may be stored in a header portion of the compression unit 202. In some embodiments, the compression unit 202 is stored as a single index row in an index table of index entries, where the leaf block 200 is a block storing data corresponding to the index table.

At block 312, the compressed index entries 206 in the compression unit 202 are accessed. For example, the compressed index entries 206 may be decompressed when the particular leaf block 200 of the database index is accessed, such as in a traversal of the database index. Accessing a compressed index entry is described in greater detail hereinafter, such as with respect to FIG. 4.

At block 314, process 300 returns and/or terminates. For example, processing may continue by passing control to a calling process, generating any appropriate record or notification, returning after a method or function invocation, or terminating.

Static and Dynamic Compression Unit Data

In some embodiments, at least a portion of a compression unit 202-204 is static after they are generated. That is, even when the database index is updated, the static portion of the compression units 202-204 are not modified. Thus, when changes are made to the database index, one or more index entries of a compression unit 202-204 may become invalid. In some embodiments, the static portion of the compression unit 202-204 includes the plurality of compressed index entries 206-208, while at least a portion of the compression unit metadata 210 is dynamic. For example, invalidity metadata 224 and the lock metadata 226 may be updated after the creation of the compression unit 200, as described in greater detail hereinafter.

Invalidity Metadata

Referring to FIG. 2B, invalidity metadata 224 is maintained in association with a compression unit 202 to track the index entries of the respective compression unit 202 that are invalid. When the index is used, the invalidity metadata 224 is accessed to determine which index entries of the plurality of compressed index entries 206 of the compression unit 202 are valid.

In some embodiments, at least a portion of each compression unit 202 is static. For example, at least the plurality of compressed index entries 206 may be static once the compression unit 202 is created until a compression unit update operation is performed. Since validity status is a dynamic value, it is preferable to store the invalidity metadata 224 outside of the plurality of compressed index entries 206. For example, the invalidity metadata 224 may be stored outside of the compression unit 202, or stored in a field of the compression unit 202 that is separate from the plurality of compressed index entries 206. In some embodiments, the invalidity metadata 224 is stored in a header of the compression unit 202, such as in a row header of a compression unit 202 that is stored as a single index row.

In some embodiments, the invalidity metadata 224 for each compression unit 202 includes an invalidity vector. As used herein, the term "vector" refers to any sequence of ordered values. In an invalidity vector, each value in the sequence indicates whether a corresponding index entry in the plurality of compressed index entries 206 of a compression unit 202 is valid or invalid. For example, the plurality of compressed index entries 206 may be treated as a sequence of ordered entries that corresponds to the ordered values of the invalidity vector.

In some embodiments, the invalidity metadata 224 for a particular compression unit 202 is stored as an invalidity bit vector. In an invalidity bit vector, each bit indicates whether a corresponding index entry in the plurality of compressed index entries 206 is valid or invalid. For example, the invalidity metadata 224 for a particular compression unit 202 may include an invalidity bitmap, where each bit indicates whether a corresponding index entry in the plurality of compressed index entries 206 is valid or invalid.

An invalid index entry in a compression unit 202 corresponds to an index entry that has been deleted from the database index. The invalidity metadata 224 may also include one or more additional values that indicate the number of invalid rows, a number of locked rows, and/or a number of logically purged rows. These metrics may be used for one or more index maintenance operations, such as determining whether to perform a compression unit update operation. When all the index entries in a compression unit 202 have been invalidated, the compression unit 202 may be deleted.

Lock Metadata

In some embodiments, lock metadata 226 is maintained in association with one or more particular compression units 202. For example, the lock metadata 226 may be maintained inside of the compression unit 202, such as in a compression unit metadata 210 portion of the compression unit 202. Alternatively, the lock metadata 226 may be partially and/or completely stored outside of the compression unit 202. The lock metadata 226 is accessed to determine whether an index entry of the plurality of compressed index entries 206 is locked by one or more processes, such as when determining whether or not a process should be granted access to a particular index entry, and/or for any other purpose where lock information is used.

A database server typically manages access for a typical database table on a row-level granularity. For example, the database server may maintain lock information for each row stored in a database block. Thus, for a typical index block without compression units, the database system will maintain lock information for each index entry. When an entire compression unit is stored as a single row in an index block, the standard row-level lock information implemented by the database server for tables will not provide lock state for individual entries represented within the compression unit that is stored as a single row. Thus, techniques to maintain row-level lock information for individual entries represented within the single-row compression unit are described herein.

Since lock state is a dynamic value, it is preferable to store the lock metadata 226 outside of the plurality of compressed index entries 206. For example, the lock metadata 226 may be stored outside of the compression unit 202 or stored in a field of the compression unit 202 that is separate from the plurality of compressed index entries 206.

In some embodiments, the compression unit 202 itself is always unlocked, and the lock metadata 226 is capable of representing any combination of locked rows. In some embodiments, the lock metadata 226 for each compression unit 202 is stored as a lock vector. In a lock vector, each lock value in the sequence indicates a lock state of a corresponding index entry in the plurality of compressed index entries 206 of a compression unit 202. For example, the plurality of compressed index entries 206 may be treated as a sequence of ordered entries that corresponds to the ordered values of the lock vector.

Lock Value Compression

In some embodiments, the lock metadata 226 is compressed using bit-level compression. For a particular compression unit 202, each different lock state of the corresponding plurality of compressed index entries 206 is assigned a value (e.g. 0-255). In some embodiments, a bit value, such as "0", represents the unlocked state. In some embodiments, the assigned values are selected to represent all the lock states for the corresponding plurality of compressed index entries 206 of the compression unit 202 in as few bits as possible. For example, a set of two bits may be used to represent three locked states in addition to the unlocked state. The corresponding example lock vector includes a sequence of 2-bit values that each describes the lock state of a corresponding compressed index entry in the corresponding compression unit.

In some embodiments, the use of lock value compression is transparent to processes that use the database index. For example, the calling code may expect an index row to have a particular lock value, such as an interested transaction list (ITL) entry with a value ranging from 1 to 255. Lock value compression may be used to map actual used ITL values in the range to a minimum range representable by a smaller number of bits. In the worst case scenario, 8 bits would be necessary to represent the lock values when 128 or more ITL values are used.

In some embodiments, the number of bits allocated per lock is stored in the block header of the leaf block 200. The leaf block 200 may be implemented such that each Have Alternatively and/or in addition, one or more leaf blocks may implement different lock value compression schemes for different compression units 202-204 such that different compression units 202-204 use a different number of bits per lock, and/or map a different compressed lock value to a different uncompressed lock value. In some embodiments, the lock value compression techniques described herein may be adapted to other lock data, such as to track the lock state of individual index entries 214-218 that are not in any compression unit 206.

When a new lock is taken, if the current number of bits is too small to represent that new lock, an additional bit may be allocated for each index entry lock value, thereby increasing the overall size of the lock metadata 226. In some embodiments, if the leaf block 200 does not have sufficient space to accommodate the increased size of the lock metadata 226, a compression unit update operation and/or a leaf block split operation is triggered on the leaf block 200. Compression unit update operations and leaf block split operations shall be described in greater detail hereinafter.

DML Operations

Data manipulation language ("DML") instructions cause a database server to modify data in a database. For example, DML instructions may cause insert, delete and update operations on rows of an indexed table. When DML instructions are executed against an indexed table, the instructions may potentially cause changes to one or more index entries.

In some embodiments, a compression unit 202 is not modified to reflect each change in the corresponding indexed table. Instead, the changes are otherwise tracked outside of the plurality of compressed index entries 206 of the compression unit 202. In some embodiments, the changes are recorded in one or more data structures of the leaf block 200 that are outside of any compression unit 202.

The changes may be incorporated into the compression unit 202 when the compression unit 202 is updated. An update of a compression unit 202 may be triggered by one or more conditions, which shall be described in greater detail hereinafter.

Index Entry Delete Operation

When a particular row of the indexed table is deleted, the corresponding index is updated to reflect the row deletion. When a row is deleted from an indexed table, such as in response to a DML, instruction to delete the row, a particular index entry corresponding to the deleted row is removed from the database index for the indexed table. If the particular index entry belongs to a particular compression unit 202, the plurality of compressed entries 206 containing the particular index entry is not modified. Instead, the invalidity metadata 224 for the particular compression unit 202 is modified to indicate that the particular index entry is invalid. This allows a delete operation to be performed without rebuilding the compression unit 202 after each delete operation, which may involve decompressing the compression unit 202, determining a new compression scheme, generating new compression unit data, and/or compressing the new compression unit data to generate the updated compression unit.

In some embodiments, the lock metadata 226 is used to determine whether a delete operation on the indexed table has been committed. When the corresponding lock metadata indicates that the particular index entry corresponding to the particular row is not locked, it can be inferred that the process which deleted the particular row has committed the corresponding transaction and released the lock on the particular index row.

Index Entry Update Operation

Invalidity metadata 224 may need to be updated when a particular row of the indexed table is modified, such as when the update to the particular row changes the key value for the particular row. Such operations may change the key value for the corresponding index entry. When a row of an indexed table is modified, such as in response to a DML instruction to update the row, the index may be updated to reflect the modification. In this case, a particular index entry corresponding to the updated row is modified when the update causes a change in the key value corresponding to the updated row.

When the index needs to be modified in response to a row update, if the particular index entry belongs to a particular compression unit 202, the particular compression unit 202 itself is not modified. Instead, the invalidity metadata 224 for the particular compression unit 202 is modified to indicate that the particular index entry is invalid. A new index entry corresponding to the updated row is added to the database index, effectively replacing the invalid index entry without modifying the plurality of compressed index entries 206 of the compression unit 202. This allows for the index update to be completed quickly without requiring the particular compression unit 202 to be rebuilt, such as by decompressing the compression unit 202, determining a new compression scheme, generating new compression unit data, and/or compressing the new compression unit data to generate the updated compression unit.

The new index entry is added to a leaf block corresponding to the key value range of the new index entry. This leaf block may be the same leaf block 200 as the original, invalidated index entry, or a different leaf block of the database index, depending on the key value of the new index entry. The new index entry may be added outside of any compression unit that currently exists in the leaf block. For example, in some embodiments, the new index entry is added as an individual index row outside of any compression unit 202-204. The new index entry may be added to a compression unit at a future point, such as during a compression unit update operation and/or a leaf block split operation, which shall be described in greater detail hereinafter.

Index Entry Insert Operation

When a new row is added to the indexed table, such as in response to a DML, instruction to insert a new row, the index is updated to reflect the modification. In this case, an index entry corresponding to the new row is added to the index. A new index entry is added to a particular leaf block with a range that includes the key value range of the new index entry. The new index entry may be added outside of any compression unit that currently exists in the particular leaf block. For example, the new index entry may be added as an individual index row outside of any compression unit in the particular leaf block. The new index entry may be added to a compression unit at a future point, such as during a compression unit update operation, which shall be described in greater detail hereinafter.

In some embodiments, if the leaf block does not have sufficient space to accommodate the new index row, a split operation may be triggered on the leaf block. Block split operations shall be described in greater detail hereinafter. Alternatively and/or in addition, when the leaf block does not have sufficient space to accommodate the new row, a compression unit update operation may be triggered. A compression unit update operation potentially creates sufficient space for a new index row by recompressing the index rows in a leaf block, possibly including the index rows in an existing compression unit, one or more individual index rows outside of the existing compression unit and/or the new index row. Compression unit update operations shall be described in greater detail hereinafter.

Compression Unit Update Operation

A compression unit update operation may be periodically performed and/or performed in response to one or more triggering events. The compression unit update operation generates an updated compression unit that omits invalid index entries that have been removed from the index. For example, the invalidity metadata 224 may be used to determine which index entries of the plurality of index entries 206 of the current compression unit 202 to omit in the updated compression unit. In some embodiments, the updated compression unit includes one or more individual index entries 214-218 in a leaf block 200.

In some embodiments, the compression unit update operation involves decompressing the original compression unit 202, removing one or more invalid index entries from the plurality of index entries 206, adding one or more individual index entries 214-218 to the plurality of index entries, determining an updated compression scheme for the updated plurality of index entries, and/or compressing the updated plurality of index entries in accordance with the updated compression scheme.

Alternatively and/or in addition, in some embodiments, a compression unit update operation is performed without decompressing the original compression unit 202. For example, if a compression scheme is unchanged for the updated compression scheme, one or more individual index entries 214-218 (including possibly one or more new index entries) may be compressed according to the compression scheme and merged with the existing compressed index entries 206 of the original compression unit 202. For example, a merge operation may combine the compressed index entries from two sorted lists (e.g. the existing compressed index entries 206 and the sorted, compressed individual index entries) and update header information and/or other compression unit metadata, thereby generating the updated compression unit.

The updated compression unit replaces the original compression unit 202 and the individual index entries 214-218. A compression unit update operation has the potential to increase the amount of available free space in a leaf block 200 due to one or more factors such as the removal of invalid index entries, the compression of the individual index entries 214-218, and/or the updating of the compression scheme for the new plurality of index entries to be compressed.

In some embodiments, each leaf block includes up to one compression unit 202, and all of the individual index entries 214-218 in the leaf block 200 are added to an updated compression unit during a compression unit update operation.

In some embodiments, the updated compression unit includes valid index entries from multiple compression units. For example, two or more compression units from the same leaf block may be merged. Alternatively and/or in addition, two or more compression units may be merged into a single compression unit when different leaf blocks of the index are merged. This may occur in a standard B-tree implementation, which allows for leaf nodes to be merged in a standard B-tree balancing operation.

Leaf Block Split Operation

When a leaf block 200 does not have enough free space available to store a new index entry that belongs to the leaf block 200, the leaf block 200 may potentially require a split. "Splitting" a leaf block involves creating a new leaf block and copying (or moving) a subset of the index entries in the "split" leaf block to the new leaf block.

In some embodiments, before a leaf block split operation is performed, a compression unit update operation is performed to free up additional space. When the additional space is sufficient to add the new index entry, then the leaf block split operation may not be necessary. Alternatively and/or in addition, the leaf block 200 may be analyzed to estimate whether the compression unit update operation will likely free up a sufficient amount of additional space. The analysis may be based on any combination of the individual index entries 214-216, compression units 206-208, compression scheme metadata 222, invalidity metadata 224, and/or lock metadata 226.

In some embodiments, a compression unit is split into two compression units, each corresponding to a subset of the range of the leaf block 200. In some embodiments, a new compression scheme is determined for each of the two compression units. Alternatively, one or both of the new compression units may retain the original compression scheme of the compression unit before the split.

Accessing an Index Entry in a Compression Unit

A database index that includes compression units can be traversed in a similar manner as a database index without compression units. More specifically, branch blocks that do not contain index entries can be traversed in a similar manner when the leaf blocks can include compression units. Once a leaf block is reached during index traversal, the compression units can be processed to access and/or otherwise process the compressed index entries.

In some embodiments, the compressed index entries 206-208 are accessed by decompressing at least a portion of a compression unit 202-204. The decompressed portion may be placed in a buffer, such as a buffer in volatile memory. In some embodiments, the index search process that triggered the decompression of the compression unit 202-204 then reads the index entries from the buffer. In some embodiments, individual index entries 214-218 of a leaf block are also read into the same buffer in volatile memory for index search process to read. In some embodiments, the index search process is exposed to both the individual index entries 214-218 and the uncompressed index entries from the compression unit/s 202-204 in the same manner, without knowledge of the underlying storage format.

Figure 4:
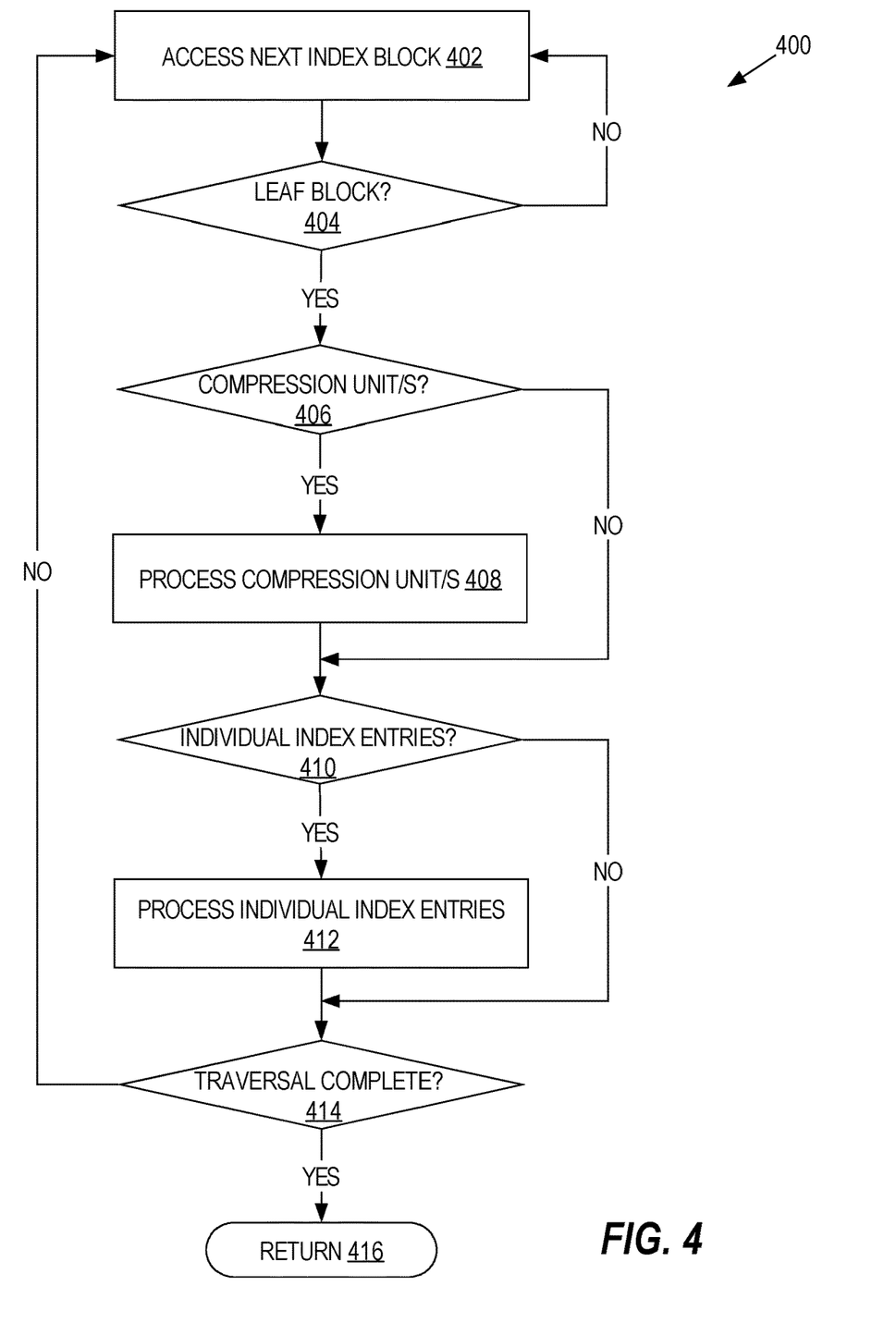
FIG. 4 is a flow diagram that illustrates an example process for accessing an index entry in a database index in accordance with one or more embodiments.

FIG. 4 is a flow diagram that illustrates an example process for accessing an index entry in a database index in accordance with one or more embodiments. Process 400 may be performed by one or more computing devices and/or processes thereof. For example, one or more blocks of process 400 may be performed by computing device 500. In some embodiments, one or more blocks of process 400 are performed by a database server.

At block 402, the next index block is accessed. In some embodiments, the first index block to be processed is the root index block of the index. Block 402 may be the next step of an index traversal, such as a recursive index traversal in response to a particular query. For example, if the particular query includes a predicate based on a particular column of the table represented by a database index, the index traversal may be an index search for rows of the indexed table that satisfy the predicate.

At decision block 404, it is determined whether the currently-accessed index block is a leaf block. If the currently-accessed index block is a leaf block, processing continues to block 406. Otherwise, processing returns to block 402. For example, if the currently-accessed index block is a branch block of the database index rather than a leaf block, processing continues to accessing the next index block, such as a child index block of the branch block that corresponds to a range of key values that matches the parameters of an index search.

At decision block 406, it is determined whether the currently-accessed leaf block includes a compression unit. For example, block metadata of the leaf block may indicate whether the currently-accessed leaf block includes one or more compression units. If the currently-accessed leaf block includes a compression unit, processing continues to block 408.

At block 408, each compression unit is processed. For example, the compression unit/s 202-204 may be fully or partially decompressed based on the corresponding compression unit metadata 210-212. Each compression unit 202-204 includes a plurality of compressed index entries 206-208 that are ordered relative to other compressed index entries in the same compression unit. This allows search techniques that rely on an order to be used within the compressed index entries 206-208 of a compression unit. In some embodiments, the decompressed index entries from the compression unit 202-204 are placed in a buffer that is made available to a calling process so that the calling process can access the indexed entries.

At decision block 410, it is determined whether the currently-accessed leaf block includes any individual index entries 214-218. If the currently-accessed leaf block includes individual index entries 214-218, processing continues to block 412. Otherwise, processing continues to block 414.

At block 412, the individual index entries of the leaf block are processed. For example, a search for the relevant key values may be performed on the individual index entries 214-218 of the compression unit. In some embodiments, the individual index entries 214-218 are ordered relative to other individual index entries 214-218 of the leaf block, but not ordered relative to any index entry in a compression unit 202-204. This allows search techniques that rely on an order to be used within the individual index entries 214-218 of a leaf block. In some embodiments, the individual index entries from the currently-accessed leaf block are placed in a buffer that is made available to the calling process, such as an index search process, so that the calling process can access the individual index entries 214-218. In some embodiments, the individual index entries 214-218 are read into the same buffer as the relevant decompressed index entries from the compression unit/s 202-204. In this case, the underlying storage format of the index entries in the buffer is transparent to the calling process.

At decision block 414, it is determined whether the index traversal is complete. For example, process 400 may be performed as a recursive traversal of a database index. At decision block 414 of a particular recursive call, decision block 414 is implicitly performed by finishing a recursive call, which automatically returns process 400 to either processing a next index block (e.g. block 402) or finishing the index traversal (e.g. block 416) when all recursive calls are complete. When the index traversal is not complete, more index blocks remain to be processed, and processing continues to block 402. When the index traversal is complete, processing continues to block 416.

At block 416, process 400 returns and/or terminates. For example, processing may continue by passing control to a calling process, generating any appropriate record or notification, returning after a method or function invocation, or terminating.

Compression Techniques

Compression techniques for a particular compression unit 202 may be selected from a number of compression techniques. A compression scheme for a particular compression unit 202 may be specifically chosen for the plurality of index entries of the particular compression unit 202. For example, based on an analysis of the plurality of index entries, one or more compression techniques and/or parameters of the compression techniques may be selected. In some embodiments, the database server automatically chooses the compression scheme for a plurality of index entries of a compression unit 202 without any user input. A compression scheme may include more than one compression technique that is simultaneously applied to the plurality of index entries in a compression unit 202.

One or more compression techniques applied to a compression unit 202 are designed such that the entire plurality of compressed index entries 206 in a compression unit 202 does not need to be decompressed to read a single compressed index entry. For example, a single compressed index entry may be decompressed, such as by reading a set of bits that store the single compressed index entry in the compression unit 202, and decompressing the set of bits based on the compression scheme metadata 222.

Prefix Compression

Prefix compression is described in greater detail in U.S. patent application Ser. No. 14/572,765, filed Dec. 16, 2014, entitled "ADAPTIVE INDEX LEAF BLOCK COMPRESSION." For example, for the key columns COUNTRY, STATE and CITY, if the leading two columns COUNTRY, STATE are shared for many index entries, then prefix compression can be used for each unique value of COUNTRY, STATE. For example, if "United States", "California" is repeated in the leading two key columns, then this set of leading values is only stored once.

Global Prefix Set Compression

One compression technique that may be applied to a compression unit 202 is global prefix set compression. That is, prefix compression is implemented for one or more sets of key columns in any order instead of just the leading N columns of the key columns. A prefix set is a set of selected key columns that will be compressed. A prefix set is not restricted to the leading N columns; the selected key columns of a prefix set may appear in any order. In some embodiments, one or more techniques and/or heuristics are used to determine optimal sets of key columns for global prefix set compression, so as to achieve the highest level of compression without compromising performance.

In some embodiments, multiple global prefix sets may be selected for a particular compression scheme of a compression unit. For example, if the key columns for a set of index entries are CITY, STATE, COUNTRY, MONTH and YEAR, then two different sets of key columns may be used for global prefix set compression. One set of key columns could be COUNTRY, STATE (such as "United States", "California"), while another set of key columns could be YEAR, MONTH (such as "2012", "January").

Intra-Column Prefix Compression

One compression technique that may be applied to a compression unit 202 is intra-column prefix compression. Intra-column prefix compression exploits the fact that there is a high likelihood that a prefix portion of each key matches the corresponding prefix portion of the preceding key. If a prefix matches a large number of key value prefixes, then compression savings can be achieved by storing the prefix value externally, such as in a dictionary table, and replacing the matching prefixes from each index entry with an identifier that represents a pointer to the corresponding dictionary entry. In some embodiments, the dictionary table is stored in the compression unit metadata 210 and/or in the leaf block 200.

For example, consider a row-set: ('abc', 1) ('abd', 2) ('abx', 3) ('aby', 4) ('abz', 5).

In the above simple example, the matching prefix 'ab' can be extracted out into a dictionary table and assigned an identifier '1.' The values in the first column are then replaced with the identifier: ('1c', 1) ('1d', 2) ('1x', 3) ('1y', 4) ('1z', 5)

In some embodiments, a greedy trie based algorithm is used to select the prefixes. A trie is a prefix tree that can be used as a search tree. A trie is built for the key column/s being compressed. The nodes of the trie represent potential prefixes. A reference count is determined for each prefix (e.g. each node in the trie). The reference count for a prefix is the number of keys that begin with the prefix under consideration. A space savings is computed for each prefix. The greedy algorithm selects the prefix that gives the greatest space savings as a dictionary entry. The marginal space savings are iteratively recomputed for the remaining prefixes.

In some embodiments, for every ancestor of the previously selected prefix (e.g. a prefix of the previously selected prefix), the reference count for the selected prefix is subtracted. In some embodiments, for prefixes that are extensions of the previously selected prefix (e.g. prefixes that begin with the previously selected prefix), the marginal space savings of the prefix are calculated. For example, the marginal space savings may be as follows: refcount(e1) *length (p2)−size(e1).

Subcolumn Suffix Compression

One compression technique that may be applied to a compression unit 202 is subcolumn suffix compression. Certain type of columns, such as dates and times, may be more amenable to suffix compression. A similar greedy trie based algorithm may also be used to select suffixes as described above with respect to prefix compression. Likewise, a similar dictionary implementation may be used.

Recursive Dictionary Compression

In some embodiments, recursive dictionary compression may be used on the dictionaries for various compression techniques described herein. For example, if the prefixes, suffixes, and/or other substrings generated include other prefixes and/or suffixes selected for inclusion in the dictionary, then the substring containing the second substring may be further compressed. For example, if the greedy trie technique described above selects and defines the following prefix substitutions ('abc', 1) ('abcd', 2) ('abcdefg', 3), further compression may be achieved by recursively applying the dictionary to the larger prefixes ('abc', 1) ('1d', 2) ('2efg', 3).

Length Byte Compression

One compression technique that may be applied to a compression unit 202 is length byte compression. As used herein, the term "length" refers to the size of a column value for a column, such as a key column or a row ID column. When the term is used with respect to a particular column as a whole, the term refers to the size of the column values in the column. The length may be a unit of storage, such as a number of bytes and/or a number of bits. The length may refer to an uncompressed size or a size after a compression scheme is applied.

In some embodiments, the plurality of compressed index entries 206 are stored as a sequence of compressed index entries 206, and one or more bytes indicating a length of each entry is used to indicate a length. The length of the entries indicate the portion of the compression unit 202 that contains each compressed index entry. For example, each compressed index entry may begin with metadata that indicates the length of the encoded data. Alternatively and/or in addition, the length of the encoded data may be stored in a length vector. In one embodiment, a bit-enclosed vector is used to describe the length of the compressed index entries in order. For example, a number of values n and an encoded length l of values can be specified to indicate that the next n*l bits describe the next n values.

In some embodiments, when the length of a key column is fixed, the length of that column may be compressed by storing the length a single time for the entire compression unit rather than once for each index entry within the compression unit. This technique may also be applied to the row ID column of an index table that stores the row ID of the row corresponding to an index entry. Alternatively and/or in addition, when a key column has a length with low variance, then a base value may be stored once for all index entries, and a variance value may be stored in a bit-enclosed vector for each index entry. This allows for the variance value to be represented with less bits. For example, if the lengths fall in a range of 1503-1510, a base value of 1503 is stored once, and a variance value of 0-7 is stored for each index entry. The variance value may be represented with 3 bits (0=000, 1=001, 2=010, 3=011, 4=100, 5=101, 6=110, 7=111), as opposed to the original lengths, which would have required 11 bits ($2^{11}$=2048).

Key Deduplication

One compression technique that may be applied to a compression unit 202 is key deduplication. In key deduplication, a single aggregate index entry is used to represent multiple index entries. An aggregate index entry is an index entry that represents multiple index rows that share a key value. For example, an aggregate index entry may specify a particular key value and a plurality of row identifiers for a plurality of columns that share the particular key value.

Row ID List Compression

When there is sufficient support for key deduplication in a compression unit, we will get lists of row IDs for rows of the table that correspond to each unique key value, as described above. In some embodiments, these lists of row IDs are compressed more efficiently using more compressive techniques, such as bitmap compression.

Sentinel Index Entries

In some embodiments, one or more compression units 202 include a set of sentinel index entries 240-244. When a compression unit 202 is generated, the sentinel index entries 240-244 are placed throughout in the compressed index entries 206 of the compression unit 202. For example, individual sentinel index entries may be placed at regular intervals. A subset of compressed index entries 230-234 is located between each sentinel index entry 240-244.

The sentinel index entries 240-244 may be used to support efficient searching. The sentinel index entries 240-244 have a lower level of compression than other compressed index entries of the compression unit 202. Thus, the sentinel index entries 240-244 may be more quickly accessed. In some embodiments, the sentinel index entries 240-244 are uncompressed, and no decompression overhead is incurred to access the sentinel index entries 240-244.

In some embodiments, the sentinel index entries 240-244 are used to search the compression unit 202 with low decompression overhead or no decompression overhead. For example, a binary search may be performed by accessing the sentinel index entries 240-244.

Database Systems

Since some embodiments described herein are implemented within the context of a database management system (DBMS), a description of a database management system is included herein. A DBMS manages a database. A DBMS may comprise one or more database servers. A database comprises database data and a database dictionary that are stored on a persistent memory mechanism, such as a set of hard disks. Database data may be stored in one or more data containers, each containing one or more records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

Users interact with a database server of a DBMS by submitting to the database server commands that cause the database server to perform operations on data stored in a database. A user may be one or more applications running on a client that interact with a database server.

A database command may be in the form of a database statement that conforms to a syntax of a database language. One example language for expressing database commands is the Structured Query Language (SQL). SQL data definition language ("DDL") instructions are issued to a DBMS to define database structures such as tables, views, or complex data types. For instance, CREATE, ALTER, DROP, and RENAME, are common examples of DDL instructions found in some SQL implementations. SQL data manipulation language ("DML") instructions are issued to a DBMS to manage data stored within a database structure. For instance, SELECT, INSERT, UPDATE, and DELETE are common examples of DML instructions found in some SQL implementations. SQL/XML, is a common extension of SQL used when manipulating XML data in an object-relational database.

Performing operations within a database server often entails invoking multiple layers of software. A layer is set of software modules that perform a functionality that has been dedicated, to an extent, within a database server to the set of software modules. Executing an operation typically involves calling multiple layers of software, with one layer making a call to another layer, which during the execution of the first call, calls another layer. For example, to execute an SQL statement, an SQL layer is invoked. Typically, a client accesses a database server through an interface, such as an SQL interface to the SQL layer. The SQL layer analyzes and parses and executes the statement. During execution of the statement, the SQL layer calls modules of a lower layer to retrieve a particular row from a table and to update a particular row in a table. A client, such as a replication client, typically accesses the database via a database command to the database server, such as in the form of a SQL statement.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the database command itself performs no actions, but rather the DBMS, upon executing the database command, performs the corresponding actions. Typically, database commands are executed over a synchronous connection to the database.

Example Implementation System

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that depicts a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   generating a first leaf block and a second leaf block of a database index for a table, wherein the first leaf block corresponds to a first range of key values and the second leaf block corresponds to a second range of key values;

determining a first compression scheme for a first plurality of index entries with key values within the first range;

determining a second compression scheme for a second plurality of index entries with key values within the second range, wherein said first compression scheme is different than said second compression scheme;

generating a first compression unit comprising a first plurality of compressed index entries by applying the first compression scheme to a first plurality of subsets of said first plurality of index entries;

generating a second compression unit comprising a second plurality of compressed index entries by applying the second compression scheme to the second plurality of index entries;

generating first compression metadata describing the first compression scheme and second compression metadata describing the second compression scheme;

storing the first compression unit and the first compression metadata in the first leaf block;

storing the second compression unit and the second compression metadata in the second leaf block; and wherein said first plurality of compressed index entries include a plurality of sentinel index entries that have a lower level of compression than said first compression scheme, wherein individual entries of said plurality of sentinel index entries are placed at regular intervals throughout said first plurality of compressed index entries; and the method is performed by one or more computing devices.

2. The method of claim 1, wherein the first compression unit is stored as a single index row in a table of index entries;

wherein the first leaf block is configured to store additional index entries in individual index rows outside of the first compression unit.

3. The method of claim 1, further comprising:

storing in the first leaf block, in association with the first compression unit, invalidity metadata;

in response to invalidation of a particular index entry in the first plurality of compressed index entries, updating the invalidity metadata to indicate that the particular index entry is removed from the database index without modifying the first plurality of compressed index entries.

4. The method of claim 3, wherein the particular index entry is invalidated based on an update operation to a particular row of the table that corresponds to the particular index entry, wherein the update operation changes a key value of the particular row;

wherein the first leaf block is configured to store individual index entries outside of the first compression unit;

further comprising generating an updated index entry for the particular row, and adding the updated index entry as an individual index entry in a corresponding leaf block of the database index.

5. The method of claim 1, further including identifying one or more rows matching a request by at least performing a binary search of the plurality of sentinel index entries.

6. The method of claim 1, further comprising, after storing the first compression unit in the first leaf block:

generating a third compression unit from a third plurality of index entries that belong in the first leaf block of the database index;

storing the third compression unit in the first leaf block;

wherein the index entries of the third compression unit are ordered by respective key values relative to each other within the third compression unit.

7. The method of claim 1, further comprising:

after storing the first compression unit in the first leaf block, storing a plurality of individual index entries in the first leaf block, wherein the individual index entries are ordered by respective key values relative to each other but not relative to the first plurality of index entries of the first compression unit.

8. The method of claim 7, further comprising performing a first compression unit update operation on the first compression unit, wherein the first compression unit update operation includes:

generating an updated first compression unit that includes the plurality of individual index entries in the first leaf block;

storing the updated first compression unit in the first leaf block in replacement of the plurality of individual index entries and the first compression unit.

9. The method of claim 1, wherein the first compression metadata includes lock metadata that specifies a lock value for each index entry of the first plurality of compressed index entries, wherein the lock values are compressed using bit-level compression based on a mapping from bit values to uncompressed lock values.

10. The method of claim 1, wherein the first plurality of compressed index entries includes an aggregate index entry that represents multiple index rows that share one or more values.

11. One or more non-transitory computer-readable media storing one or more sequences instructions that, when executed by one or more hardware processors, cause:

generating a first leaf block and a second leaf block of a database index for a table, wherein the first leaf block corresponds to a first range of key values and the second leaf block corresponds to a second range of key values;

determining a first compression scheme for a first plurality of index entries with key values within the first range;

determining a second compression scheme for a second plurality of index entries with key values within the second range, wherein said first compression scheme is different than said second compression scheme;

generating a first compression unit comprising a first plurality of compressed index entries by applying the first compression scheme to a first plurality of subsets of said first plurality of index entries;

generating a second compression unit comprising a second plurality of compressed index entries by applying the second compression scheme to the second plurality of index entries;

generating first compression metadata describing the first compression scheme and second compression metadata describing the second compression scheme;

storing the first compression unit and the first compression metadata in the first leaf block;

storing the second compression unit and the second compression metadata in the second leaf block; and wherein said first plurality of compressed index entries include a plurality of sentinel index entries that have a lower level of compression than said first compression scheme, wherein individual entries of said plurality of sentinel index entries are placed at regular intervals throughout said first plurality of compressed index entries.

12. The one or more non-transitory storage media of claim 11,
wherein the first compression unit is stored as a single index row in a table of index entries;
wherein the first leaf block is configured to store additional index entries in individual index rows outside of the first compression unit.

13. The one or more non-transitory storage media of claim 11, wherein the one or more sequences of instructions include instructions that, when executed by one or more hardware processors, cause:
storing in the first leaf block, in association with the first compression unit, invalidity metadata;
in response to invalidation of a particular index entry in the first plurality of compressed index entries, updating the invalidity metadata to indicate that the particular index entry is removed from the database index without modifying the first plurality of compressed index entries.

14. The one or more non-transitory storage media of claim 13, wherein
the one or more sequences of instructions include instructions that, when executed by one or more hardware processors, cause the particular index entry to be invalidated based on an update operation to a particular row of the table that corresponds to the particular index entry, wherein the update operation changes a key value of the particular row;
the first leaf block is configured to store individual index entries outside of the first compression unit;
the one or more sequences of instructions include instructions that, when executed by one or more hardware processors, cause generating an updated index entry for the particular row, and adding the updated index entry as an individual index entry in a corresponding leaf block of the database index.

15. The one or more non-transitory storage media of claim 11, wherein the one or more sequences of instructions include instructions that, when executed by one or more hardware processors, cause identifying one or more rows matching a request by at least performing a binary search of the plurality of sentinel index entries.

16. The one or more non-transitory storage media of claim 11, wherein the one or more sequences of instructions include instructions that, when executed by one or more hardware processors, cause, after storing the first compression unit in the first leaf block:
generating a third compression unit from a third plurality of index entries that belong in the first leaf block of the database index;
storing the third compression unit in the first leaf block;
wherein the index entries of the third compression unit are ordered by respective key values relative to each other within the third compression unit.

17. The one or more non-transitory storage media of claim 11,
wherein the one or more sequences of instructions include instructions that, when executed by one or more hardware processors, cause, after storing the first compression unit in the first leaf block, storing a plurality of individual index entries in the first leaf block,
wherein the individual index entries are ordered by respective key values relative to each other but not relative to the first plurality of index entries of the first compression unit.

18. The one or more non-transitory storage media of claim 17, wherein the one or more sequences of instructions include instructions that, when executed by one or more hardware processors, cause performing a first compression unit update operation on the first compression unit, wherein the first compression unit update operation includes:
generating an updated first compression unit that includes the plurality of individual index entries in the first leaf block;
storing the updated first compression unit in the first leaf block in replacement of the plurality of individual index entries and the first compression unit.

19. The one or more non-transitory storage media of claim 11, wherein the first compression metadata includes lock metadata that specifies a lock value for each index entry of the first plurality of compressed index entries, wherein the lock values are compressed using bit-level compression based on a mapping from bit values to uncompressed lock values.

20. The one or more non-transitory storage media of claim 11, wherein the first plurality of compressed index entries includes an aggregate index entry that represents multiple index rows that share one or more values.

* * * * *

UNITED STATES PATENT AND TRADEMARK OFFICE
CERTIFICATE OF CORRECTION

PATENT NO. : 11,789,923 B2
APPLICATION NO. : 15/267759
DATED : October 17, 2023
INVENTOR(S) : Shergill et al.

It is certified that error appears in the above-identified patent and that said Letters Patent is hereby corrected as shown below:

On the Title Page

On page 2, Column 2, item [56] under Other Publications, Line 1, delete ""Fundatmentals" and insert -- "Fundamentals --, therefor.

In the Specification

In Column 3, Line 59, delete "DML," and insert -- DML --, therefor.

In Column 4, Line 46, delete "exclusive." and insert -- exclusive). --, therefor.

In Column 12, Line 1, delete "DML," and insert -- DML --, therefor.

In Column 13, Line 3, delete "DML," and insert -- DML --, therefor.

In Column 17, Line 38, delete "5)" and insert -- 5). --, therefor.

In Column 20, Line 1, delete "XML," and insert -- XML --, therefor.

Signed and Sealed this
Twenty-fifth Day of June, 2024

Katherine Kelly Vidal
*Director of the United States Patent and Trademark Office*